United States Patent [19]

Schmidt et al.

[11] Patent Number: 5,236,256
[45] Date of Patent: Aug. 17, 1993

[54] HYDRAULIC BRAKE SYSTEM, IN PARTICULAR FOR MOTOR VEHICLES

[75] Inventors: Guenther Schmidt, Tamm-Hohenstange; Karl-Heinz Willmann, Freiberg/N, both of Fed. Rep. of Germany

[73] Assignee: Robert Bosch GmbH, Stuttgart, Fed. Rep. of Germany

[21] Appl. No.: 834,094

[22] Filed: Feb. 12, 1992

[30] Foreign Application Priority Data

Feb. 28, 1991 [DE] Fed. Rep. of Germany ....... 4106336

[51] Int. Cl.$^5$ .............................................. B60T 13/14
[52] U.S. Cl. .............. 303/113.2; 303/113.4; 303/116.2; 303/DIG. 4
[58] Field of Search ............. 303/11, 113 R, 113 TR, 303/113 SS, 116 SP, 116 R, DIG. 3, DIG. 4, 87

[56] References Cited

U.S. PATENT DOCUMENTS

| | | | |
|---|---|---|---|
| 4,462,642 | 7/1984 | Leiber | 303/DIG. 4 |
| 4,627,671 | 12/1986 | Matsui et al. | 303/116 SP |
| 4,844,558 | 7/1989 | Ishii et al. | 303/116 R |
| 5,026,124 | 6/1991 | Resch | 303/113 TR |
| 5,131,730 | 7/1992 | Kollers et al. | 303/116 SP |
| 5,141,296 | 8/1992 | Arikawa | 303/116 R |

FOREIGN PATENT DOCUMENTS 4004270 8/1991 Fed. Rep. of Germany.

*Primary Examiner*—Robert J. Oberleitner
*Assistant Examiner*—Kevin D. Rutherford
*Attorney, Agent, or Firm*—Edwin E. Greigg; Ronald E. Greigg

[57] ABSTRACT

A system which reduces an electric load on an on-board electrical system of a vehicle. The brake system has an anti-lock and traction control system. The latter has a high-pressure pump, with which pressure fluid can be withdrawn from a supply container and fed into a brake line. A charging valve that can be switched out of its shutoff position into its open position by a control unit is disposed in an intake line of the high-pressure pump. The control unit switches the charging valve into its open position at least whenever feeding of pressure fluid into the brake line is demanded. The brake system is especially well-suited to passenger cars, which have a very severely fluctuating rear axle load status.

4 Claims, 2 Drawing Sheets

HYDRAULIC BRAKE SYSTEM, IN PARTICULAR FOR MOTOR VEHICLES

RELATED PATENT APPLICATION

This application is co-pending with application Ser. No. 07/606,264 filed Oct. 31, 1990.

BACKGROUND OF THE INVENTION

The invention is based on a hydraulic brake system as defined hereinafter.

A dual-circuit brake system for a two-axle motor vehicle of this kind has already been proposed (German Patent Application P 40 04 270.7, FIG. 7, see related patent application), in which a high-pressure pump, as a function of a pressure pickup connected to a brake line, aspirates pressure fluid from a pressure fluid supply tank of the master brake cylinder, with shutoff valves closed, and feeds it into the brake lines of both brake circuits. With the aid of an electronic control unit, the brake pressure in the brake circuits, each of which is assigned to one vehicle axle, is controlled in accordance with the so-called ideal brake force distribution. Moreover, in this brake system, locking of the vehicle wheels upon braking or spinning of driven vehicle wheels is avoided by making an anti-lock and traction control system come into play, which in phases of pressure reduction draws brake fluid out of the wheel brake and returns it to the pressure fluid supply tank or in phases of pressure buildup feeds it into the brake line. The excess pressure fluid pumped by the high-pressure pump, which is driven continuously during braking and aspirates from the pressure fluid supply container of the master brake cylinder is diverted to the pressure fluid supply container via a pressure limiting valve. This is unfavorable, however, because the pumping operation produces undesirable heating of the pressure fluid and of the pump drive motor.

OBJECT AND SUMMARY OF THE INVENTION

The brake system according to the invention has an advantage over the prior art that pressure fluid can be delivered to the high-pressure pump only in operating states of the brake system such that a brake pressure buildup is required in at least one of the wheel brakes of the brake circuit connected to the pump. The withdrawal of energy from the on-board electrical system of the vehicle for operating the high-pressure during braking is therefore reduced, and heating of the pressure fluid and of the pump drive motor is lessened, because the pump can pump only if the control unit switches the charging valve to the opening position. Because of this intake control, the high-pressure pump can nevertheless furnish pressure fluid very fast.

Advantageous further features of and improvements are possible with the provisions recited herein.

By provision set forth herein for the majority of braking events, the low-pressure pump can furnish the requisite adequate pressure for that purpose, and with the charging valve switched open can feed directly into the brake line, bypassing the high-pressure pump. In such braking events, the control unit does not need to put the high-pressure pump into operation.

By other provision set forth herein, braking events with high pressure, both pumps and the charging valve are triggered, because until the high-pressure pump becomes operative the low-pressure pump is already building up brake pressure in the wheel brake through the feed line. Since the low-pressure pump otherwise supplies pressure fluid to the high-pressure pump, it is unnecessary to embody the high-pressure pump as a self-aspirating pump.

By other features of the invention disclosed, an advantage is attained that triggering of the low-pressure and high-pressure pump is unnecessary, because in braking events at low pressure and with little brake pressure modulation, the requisite pressure fluid can be drawn from the low-pressure reservoir and fed into the brake line through the feed line.

An embodiment of the invention defined herein assures that on the one hand the pressure generatable by the high-pressure pump in the traction control mode is limited, yet on the other hand a very high brake pressure generated by the driver when the shutoff valve is open, for instance in panic braking, is not diverted.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
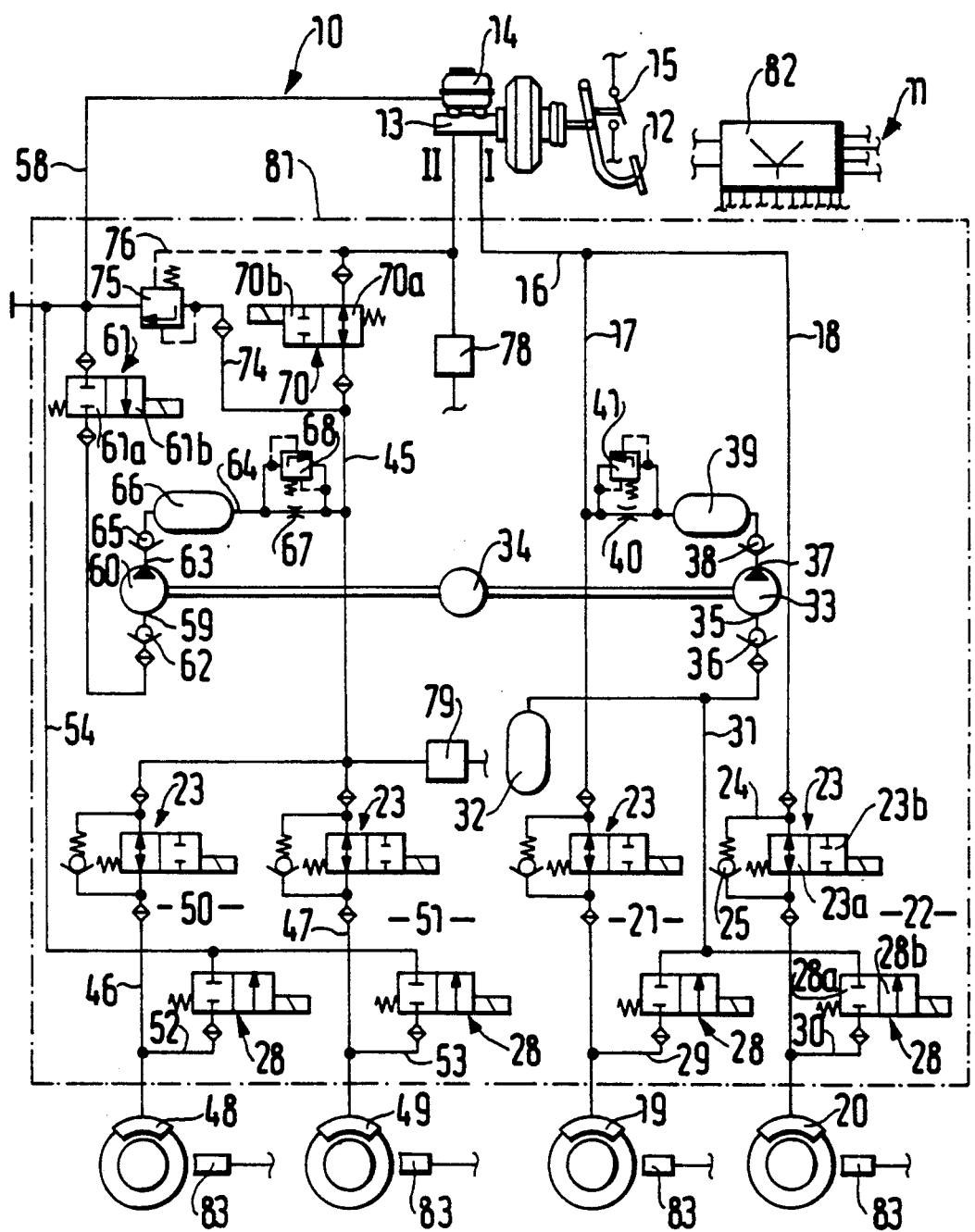
FIG. 1 is a circuit diagram of a brake system having a high-pressure pump, in the intake line of which there is a charging valve.

The first exemplary embodiment, shown in FIG. 1, includes a hydraulic brake system 10 for motor vehicles, having an anti-lock and traction control system 11. The brake system 10 has a dual-circuit master brake cylinder 13, actuatable by a brake pedal 12 and having a pressure fluid supply container 14. A brake light switch 15 is also actuatable with the brake pedal 12.

The brake circuit I includes a brake line 16, beginning at the master brake cylinder 13 and branching into two brake lines 17 and 18. The brake lines 17 and 18 lead to wheel brakes 19 and 20 of nondriven wheels of a front axle, not shown, of the vehicle. Each of the brake lines 17 and 18 is assigned a respective valve assembly 21 and 22 for controlling phases of pressure buildup, pressure holding and pressure reduction for the purposes of brake pressure modulation in the wheel brakes 19 and 20, respectively. Each valve assembly 21 and 22 has an inlet valve 23 located in the respective brake line 17 and 18. This valve is embodied as a 2/2-way valve with a spring-actuated open position 23a and an electromagnetically switchable shutoff position 23b. Extending parallel to the applicable inlet valve 23 is a bypass line 24 having a one-way check valve 25, which has an open direction from the applicable wheel brake 19 or 20 to the master brake cylinder 13.

The valve assemblies 21 and 22 also each have one outlet valve 28, which is located in a return line 29 and 30, respectively, beginning at the corresponding brake line 17 or 18 between the wheel brake 19 or 20 and the inlet valve 23. The outlet valve 28 is likewise embodied as a 2/2-way valve, with a spring-actuated shutoff position 28a and an electromagnetically switchable open position 28b. Downstream of the outlet valves 28 of the two valve assemblies 21 and 22, the return lines 29 and 30 continue in the form of a joint return line 31. Connected to the return line 31 is a reservoir chamber 32 for holding pressure fluid withdrawn from the wheel brakes 19 and 20. A non-self-aspirating high-pressure pump 33, in the form of a piston pump that is drivable by an electric motor 34, is located in the return line 31. A first one-way check valve 36 is located on the inlet side 35 of the high-pressure pump 33; a second one-way check valve 38 is assigned to the outlet side 37 of the high-pressure pump 33. The check valves 36 and 38 are components of the high-pressure pump 33. In the pressure direction of the high-pressure pump 33 there are also a damper chamber 39 and a throttle 40 with a pressure limiting valve 41, all located in the return line 31. The return line 31 discharges into the brake line 17 between the valve assembly 21 and the master brake cylinder 13.

The brake circuit II likewise has a brake line 45 beginning at the master brake cylinder 13 and branching into two brake lines 46 and 47. The brake lines 46 and 47 lead to wheel brakes 48 and 49, respectively, of driven vehicle wheels of a rear vehicle axle, again not shown. The brake lines 46 and 47 are each assigned a respective valve assembly 50 and 51 for brake pressure modulation. The valve assemblies 50, 51 of brake circuit II are equipped in the same manner as in brake circuit I, each with one inlet valve 23 and one outlet valve 28. The outlet valve 28 of the valve assemblies 50 and 51 are each located in a respective return line 52 or 53 that begins at the corresponding brake line 46 or 47. The return lines 52 and 53 are joined into one return line 54.

Beginning at the pressure fluid supply container 14 of the master brake cylinder 13, an intake line 58 leads to the inlet side 59 of a high-pressure pump 60 of brake circuit II. Disposed in the intake line 58 is a charging valve 61 in the form of a 2/2-way valve, which has a spring-actuated shutoff position 61a and an electromagnetically switchable open position 61b. The return line 54 is connected to the intake line 58 between the charging valve 61 and the pressure fluid supply container 14. The return line 54 thus communicates indirectly with the pressure fluid supply container 14, so that pressure fluid withdrawn from the wheel brakes 48, 49 can be returned to the pressure fluid supply container 14.

The high-pressure pump 60 of brake circuit II, which is embodied as a self-aspirating piston pump and is drivable by the drive motor 34, is assigned a one-way check valve 62 on its inlet side. A pressure line 64 having a one-way check valve 65 begins at the outlet side 63 of the high-pressure pump 60. Both check valves 62 and 65 are part of the high-pressure pump 60. In the pressure line 64, in succession in the pumping direction of the pump 60 downstream of the check valves 65, there are a damper chamber 66 and a throttle 67 with a pressure limiting valve 68. The pressure line 64 discharges into the brake line 45 between the valve assemblies 50, 51 and a shutoff valve 70 disposed toward the master brake cylinder in the brake line 45. The shutoff valve 70 is a 2/2-way valve with a spring-actuated open position 70a and an electromagnetically switchable shutoff position 70b.

An overflow line 74, in which a pressure limiting valve 75 is disposed, begins at the brake line 45 between the connection of the pressure line 64 and the shutoff valve 70. A control line 76, which begins at the brake line 45 between the master brake cylinder 13 and the shutoff valve 70, is connected to the pressure limiting valve 75 to increase its response pressure. The overflow line 74 discharges into the intake line 58 between the pressure fluid supply container 14 and the charging valve 61.

In brake circuit II, the brake system 10 has a first pressure pickup 78, connected to the brake line 45 between the master brake cylinder 13 and the shutoff valve 70, and a second pressure pickup 79, connected to the brake line 45 between the shutoff valve 70 and the valve assemblies 50, 51.

The elements of the brake system 10 located in brake circuits I and II between the master brake cylinders 13 and the wheel brakes 19, 20, 48, 49 are structurally combined into a hydraulic unit 81, represented in the drawing by a dot-dash line. The anti-lock and traction control system 11 is also equipped with an electronic control unit 82, which evaluates the signals of rpm sensors 83, monitoring the rotational behavior of the vehicle wheels, and of the pressure pickups 78, 79 and brake light switch 15, and which by a predetermined control algorithm converts them into switching signals for the various valves and for the drive motor 34 of the high-pressure pumps 33 and 60 of the anti-lock and traction control system 11.

The mode of operation of the hydraulic brake system is as follows:

Pressure is generated in the master brake cylinder 13 by actuation of the brake pedal 12. In this process the inlet valves 23 and outlet valves 28 of the valve assemblies 21 and 22 of brake circuit I assume the position shown in FIG. 1, so that brake pressure becomes operative in the wheel brakes 19 and 20 by displacement of quantities of pressure fluid in the brake lines 16, 17 and 18. Upon actuation of the brake pedal 12, the switch 15 is also closed, the signal of which activates the control unit 82 for switching the shutoff valve 70 to the shutoff position 70b and for switching the charging valve 61 into the open position 61b, and for putting the drive motor 34 into operation. In brake circuit II, the pressure generated by the master brake cylinder 13 is also detected by the pressure pickup 78 and evaluated by the control unit 82.

While the high-pressure pump 33 in brake circuit I cannot pump any pressure fluid, the high-pressure pump 60 in brake circuit II is capable of aspirating pressure fluid from the pressure fluid supply container 14 through the intake line 58 and feeding it into the brake line 45 through the pressure line 64. The high-pressure pump 60 therefore serves as a source of servo pressure. Since the inlet valves 23 and outlet valves 28 of the valve assemblies 50 and 51 in brake circuit II take the position shown, brake pressure is built up as a result in the wheel brakes 48 and 49 of the driven rear axle. This pressure is detected by the pressure pickup 79 and likewise evaluated by the control unit 82. In accordance with the predetermined pressure of the master brake cylinder 13, detected by the pressure pickup 78, operation then continues, with alternating triggering of the charging valve 61 or of the outlet valves 28 of the outlet valve assemblies 50 and 51 into the applicable opening position 61b or 28b or into the shutoff position 61a or 28a, respectively, until such time as a wheel brake pressure stored in memory in the control unit 82 is attained as a function of the pressure predetermined by the master brake cylinder 13, or until one of the wheels of the rear axle exhibits any unstable rotation.

This control, known as electronic brake boosting, of the wheel brake pressure as a function of the master brake cylinder pressure in accordance with the function stored in memory in the control unit 82 substantially represents the ideal brake force distribution for a fully loaded vehicle; that is, the rear axle brake force is raised up to the locking limit for the wheels of the driven rear axle. If the vehicle is not fully loaded, however, then the control unit 82, from the signals of the rpm sensors 83, detects skidding at the wheels of the rear axle and will lower the pressure in the wheel brakes 48, 49 of the rear wheels in accordance with an algorithm not further described here.

If both outlet valves of the valve assemblies 50 and 51 are opened while the charging valve 61 is closed and the inlet valves 23 of these valve assemblies are open, then the brake pressure in the wheel brakes 48 and 49 of the rear axle is lowered to the same level (this is known as select-low control). By closure of the inlet valve 23 and opening of the outlet valve 28 of the corresponding valve assembly 50 or 51, however, individual control of the brake pressure in the wheel brakes 48, 49 is also possible.

In brake circuit I, the pressure buildup and pressure reduction in the wheel brakes 19 and 20 during normal braking operation accordingly takes place by displacing quantities of pressure fluid from the master brake cylinder to the wheel brakes 19, 20, through the brake lines 16, 17 and 18, and vice versa. In brake circuit II, contrarily, brake pressure is generated in the wheel brakes 48 and 49 by controlling the suction of the high-pressure pump 60; that is, the high-pressure pump 60 can pump pressure fluid and build up brake pressure only when the charging valve 61 is open. Upon a reduction of brake pressure in the wheel brakes 48 and 49, pressure fluid is diverted to the pressure fluid supply container 14 with the outlet valves 28 of the valve assemblies 50 and 51, through the return line 54 and the intake line 58. In brake circuit II, even with open inlet valves 23 of the valve assemblies 50 and 51 and with the shutoff valve 70 switched to its open position 70a, a brake pressure reduction is still possible through the brake line 45 to the master brake cylinder 13.

If the pressure generated by the master brake cylinder 13 is increased further upon actuation of the brake pedal 12, then as with the rear-axle wheels, the danger of locking arises at the front-axle wheels. The control unit 82, based on the signals of the rpm sensors 83 at the wheels in brake circuit I switches the valve assemblies 21 and 22 for brake pressure modulation in the wheel brakes 19 and/or 20. In a phase for brake pressure reduction, the corresponding inlet valve 23 is switched to the shutoff position 23b and the corresponding outlet valve 28 is switched to the open position 28b, so that pressure fluid can flow out of the associated wheel brake 19 and/or 20 through the return line 31 to the high-pressure pump 33 of brake circuit I and can be pumped back to the master brake cylinder 13.

In pressure holding phases, the corresponding outlet valve 28 is also switched into the shutoff position 28a. In pressure buildup phases, contrarily, brake pressure from the master brake cylinder 13 is fed into the associated wheel brake 19 or 20 by switching the applicable inlet valve 23 into the open position 23a.

In brake circuit II, upon the appearance of wheel locking at the wheels of the rear axle during a braking event, the control unit 82 will terminate the electronic brake boosting operation, or in other words the control of the wheel brake pressure as a function of the master cylinder brake pressure, because as a rule the pressure predetermined by the master brake cylinder 13 will be greater than the brake pressure causing locking of the rear wheels, or in other words the control unit 82 can ignore the signal of the pressure pickup 79. Since brake circuit II is a so-called open brake circuit, and in brake pressure modulation pressure fluid flows out of the wheel brakes 48 and 49 to the pressure fluid supply container 14, the charging valve 61 is switched by the control unit 82 into the open position 61b, so that the high-pressure pump 60, in the anti-lock mode, can feed pressure fluid continuously into the brake line 45. In this process the control unit 82 keeps the shutoff valve 70 continuously closed. Phases for pressure reduction, pressure holding and pressure buildup for purposes of brake pressure modulation in the wheel brakes 48, 49 of the rear axle are switched by the control unit 82, by suitable triggering of the inlet valve 3 and outlet valve 28 of the valve assemblies 50 and 51. Pressure fluid fed into the brake line 45 by the high-pressure pump 60, in the event that it is not drawn upon, is diverted to the intake line through the overflow line 74 and the pressure limiting valve 75, the latter pilot-controlled to an increased response pressure.

If a loss of traction arises at the wheels of the rear axle, then the control unit 82 puts the shutoff valve 70 into the shutoff position 70b and sets the drive motor 34 into operation. For phases of pressure buildup in the wheel brake 48 or 49 of the slipping driven wheel, or of the wheel brakes 48, 49 of the slipping driven wheels, the control unit 82 switches the charging valve 61 into the open position 61b, so that the high-pressure pump 60 can aspirate pressure fluid from the pressure fluid supply container 14 and feed it into the brake line 45. The control unit 82 will limit an adequate brake pressure buildup in the applicable wheel brake or both wheel brakes 48, 49 by switching over the charging valve 61 to the shutoff position 61a or by correspondingly controlling the inlet valves 23 of the valve assemblies 50 and 51. In the latter case, the pressure fluid continuing to be pumped by the high-pressure pump 60 is diverted to the pressure fluid supply container 14 by the pressure limiting valve 75 at the lower response pressure.

The hydraulic brake system 10 is capable of functioning even if the electrical energy supply of the vehicle fails. Since the valves of the brake system 10 then assume their position shown in FIG. 1, pressure generated by the master brake cylinder 13 in brake circuit II, just as in brake circuit I, can become operative directly in the wheel brakes 19, 20, 48, 49, and the vehicle can be braked with conventional brake tuning.

The control unit 82 is also arranged for automatically carrying out test procedures of valves having importance in terms of safety:

When the vehicle is stopped, a possible leakage of the outlet valve 28 of the valve assemblies 50 and 51, of the pressure limiting valve 75 and of the shutoff valve 70 in brake circuit II can be checked as follows: the control unit 82 switches the shutoff valve 70 to the shutoff position 70b and switches the charging valve 21 to the opening position 61b and also turns on the drive motor 34 of the high-pressure pump 60. Once a predetermined pressure value, detected by the pressure pickup 79, is attained, which can for instance amount to the response pressure of the pressure limiting valve 75 with some tolerance taken into account, the drive motor 34 is switched off and the charging valve 61 is closed. If the pressure detected thereafter by the pressure pickup 79 does not remain constant, then a leak is present at the outlet valves 28, pressure limiting valve 75, and/or shutoff valve 70.

If upon a braking event with a pressure specified by the master brake cylinder and detected by the pressure pickup 78, the set-point value stored in memory in the control unit 82 for the wheel brake pressure, detected by the pressure pickup 79, in brake circuit II is not attained after a predetermined period of time, then a brake circuit failure is involved. By alternating switching of the inlet valves 23 of the valve assemblies 50 and 51 to the shutoff position 23b, the applicable failure path can be discovered, if the wheel brake pressure is then adjusted. In the case of damage, the control unit 82 will send a report to the driver, so that he will take the vehicle for repair. If he continues to drive the vehicle, the control unit 82 will keep the damaged inlet valve 23 in the shutoff position 23b, so that no pressure fluid is lost and so that braking can continue to be performed nevertheless with three wheel brakes. In this kind of damage situation in brake circuit II, the control unit 82 will forbid anti-lock and traction control functions at the wheel brakes 48, 49 of the rear axle. Additionally, the control unit 82 will store the damage report in a memory, so that the report is maintained even if travel is interrupted.

Figure 2:
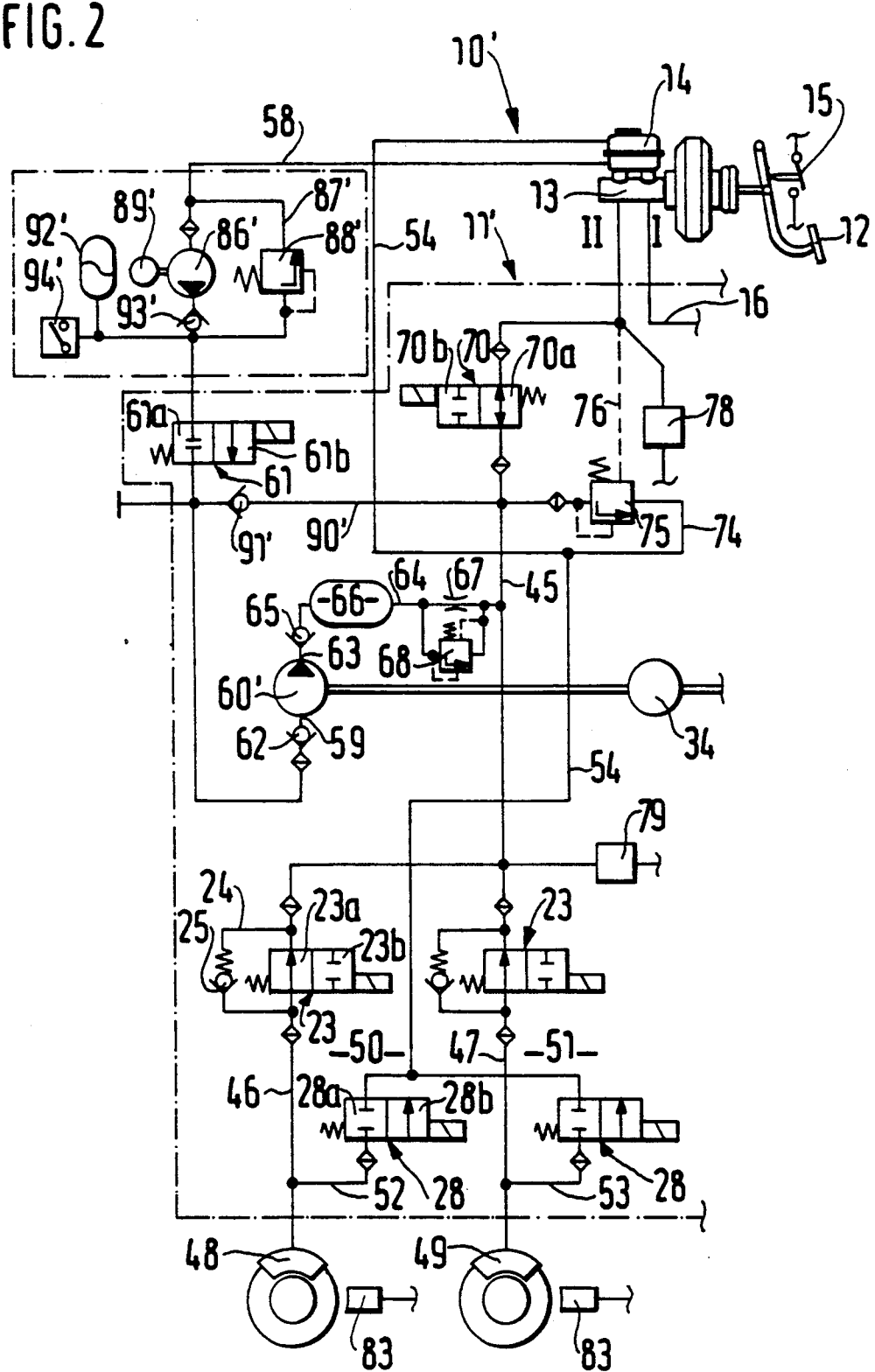
FIG. 2 shows a brake circuit of the brake system of FIG. 1, but with a low-pressure pump connected to the inlet side of the high-pressure pump and having a parallel low-pressure reservoir and with a feed line, between the charging valve and the high-pressure pump, leading to a brake line.

The second exemplary embodiment, shown in FIG. 2, pertains to a brake system 10', which differs from that of FIG. 1 only in brake circuit II. The same reference numerals are therefore adopted for identical components that function the same; elements differing from the first exemplary embodiment and new ones in the brake circuit 10' are identified by the same reference numeral, with the ' added.

The substantial distinguishing characteristic of the brake system 10' is a low-pressure pump 86, disposed in the intake line 58 between the pressure fluid supply container 14 and the charging valve 61. The low-pressure pump 86' is embodied as self-aspirating and is capable of generating a pressure of up to 30 bar. For pressure limitation, a bypass line 87' having a pressure limiting valve 88' is disposed parallel to the low-pressure pump 86'. The low-pressure pump 86' can be driven by an electric motor 89', which is switched by a control unit 82 that cannot be seen in FIG. 2. Triggering of the high-pressure pump 60 and low-pressure pump 86' can be done by the control unit 82 by separate control algorithms. A feed line 90' also begins at the intake line 58, between the charge valve 61 and the high-pressure pump 60, the latter here embodied as non-self-aspirating; the feed line leads to the brake line 45 between the shutoff valve 70 and the valve assemblies 50, 51 and has a one-way check valve 91', which is open from the intake line 58 to the brake line 45. The return line 54 beginning at the outlet valve 28 of the valve assemblies 50 and 51 discharges in this exemplary embodiment directly into the pressure fluid supply container 14 of the master brake cylinder 13. The overflow line 74 beginning at the brake line 45 and having the pressure limiting valve 75 is connected to the return line 54. Finally, a low-pressure reservoir 92' can be connected to the intake line 58 between the low-pressure pump 86' and the charging valve 61. In that case, it is necessary to dispose a check valve 93 with its blocking direction toward the pump in the intake line 58 between the low-pressure pump 86' and the connection of the low-pressure reservoir 92'. The pressure in the low-pressure reservoir 92' can be detected with a pressure switch 94', with which the drive motor 89' of the low-pressure pump 86 can be switched on.

The mode of operation of the hydraulic brake system 10' of FIG. 2 is substantially the same as that of the brake system 10 of FIG. 1. Only the feeding of brake pressure into the brake line 45 is attained in a different manner:

Without the low-pressure reservoir 92', upon detection of braking (by closure of the switch 15 followed by electronic brake boosting operation and optionally anti-lock operation, as well as from the signals of the rpm sensors 83 in the case of the traction control mode), the control unit 82 closes the shutoff valve 70 and puts the drive motor 89' of the low-pressure pump 86' into operation. In accordance with the characteristic curve, stored in memory, in the control unit 82, for the dependency of the brake pressure toward the wheel brake, detected with the pressure pickup 79, on the master brake cylinder pressure detected by the pressure pickup 78, the charging valve 61 is opened by the control unit. The low-pressure pump 86' can now aspirate pressure fluid from the pressure fluid supply container 14 and, with the charging valve open, feed it through the feed line 90' into the brake line 45, overcoming the check valve 91'. The control unit 82 keeps the charging valve 61 open until such time as the set-point brake pressure in the wheel brakes 48, 49 of the rear wheels is attained, or until the pressure of these brakes becomes unstable. As long as the set-point pressure in the wheel brakes 48, 49 remains below the pressure that can be generated by the low-pressure pump 86', this pump suffices for building up brake pressure. The drive motor 34 of the high-pressure pump 60' therefore does not need to be switched on by the control unit 82. Not until higher wheel brake pressures are necessary, above the pressure that can be generated by the low-pressure pump 86', does the control unit 82 switch on the drive motor 34 of the high-pressure pump 60'. This pump 60', which is now supplied with pressure fluid by the low-pressure pump 86', then pumps that pressure fluid at high pressure into the brake line 45. The flow of fluid through the feed line 90' comes to a stop in this process, and the entire quantity pumped by the low-pressure pump 86' serves to precharge the high-pressure pump 60'.

In the traction control mode, it is sufficient to put the low-pressure pump 86' into operation. The adjustment of the necessary brake pressure in the wheel brakes 48, 49 of the rear axle can be done either by pressure modulation with the inlet valves 23 and outlet valves 28 of the valve assemblies 50, 51 or by switching the charging valve 61 into the open position 61b for a limited time.

If the hydraulic brake system 10' is equipped with a low-pressure reservoir 92', then upon braking, to generate low wheel brake pressures and with little brake pressure modulation, pressure fluid stored in the reservoir under pressure can be withdrawn simply by switching the charging valve 61 into the open position 61b, without having to switch on the low-pressure pump 86' and high-pressure pump 60'. In order not to exhaust the reservoir 92', the point at which the low-pressure pump 86' or high-pressure pump 60, is switched on is defined by the level of the pressure of the master brake cylinder and wheel brake, adjusted upon braking, and in accordance with the course over time of these pressures, by an algorithm stored in memory in the control unit 82. Operation with only the reservoir 92' and the low-pressure pump 86, has the further advantage that the on-board electrical system is relieved in terms of energy supply, and moreover less noise is produced, which is an advantage in terms of comfort.

Recharging of the low-pressure reservoir 92' can be done in various ways:

a) Depending on a maximum possible leakage, the low-pressure reservoir 92' is charged at predetermined time intervals by putting the low-pressure pump 86' into operation for a predetermined charging period.

b) When the vehicle is at a stop, the shutoff valve 70 is switched into its shutoff position 70b and the charging valve 61 is switched into its open position 61b by the control unit 82, as a result of actuation of the brake pedal 12, so that the pressure of the low-pressure reservoir 92' that builds up at the pressure pickup 79 is detected, and depending on the pressure level, recharging of the reservoir with the aid of the low-pressure pump 86' can be tripped.

c) After the termination of each braking event and each traction control operation, the low-pressure reservoir 92' is charged for a predetermined period of time, which depends on the volume of the low-pressure reservoir and on the capacity of the low-pressure pump 86'.

d) By means of the pressure switch 94' on the low-pressure reservoir 92', with switching hysteresis between a lower turn-on pressure $p_n$ and an upper turn-off pressure $p_o$, the reservoir can always be recharged by the low-pressure pump 86', regardless of the anti-lock or traction control status of the system at the time.

Monitoring of the valves involved in safety is possible in the hydraulic brake system 10' of FIG. 2 in the same way as in the first exemplary embodiment.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A hydraulic brake system (10) for motor vehicles, having an anti-lock and traction control system (11),
   a multicircuit master brake cylinder (13) with a pressure fluid supply container (14) and a brake-pedal-actuable switch (15) located at the brake pedal,
   at least one brake line (45, 46) beginning at the master brake cylinder (13) and leading to at least one wheel brake (48) of a brake circuit (II),
   a valve assembly (50), assigned to the at least on wheel brake (48), for controlling phases for pressure buildup, pressure holding and pressure reduction for the brake pressure modulations in the wheel brake (48), wherein in the pressure reduction phase pressure fluid withdrawn from the wheel brake (48) is returned to the pressure fluid supply container (14),
   a shutoff valve (70) in the brake line (45) between the master brake cylinder (13) and the valve assembly (50),
   a high-pressure pump (60), drivable by an electric motor (34) and capable of being supplied at least indirectly from the pressure fluid supply container (14) through an intake line (58), which pump serves as a servo pressure source for feeding pressure fluid into the brake line (45) between the shutoff valve (70) and the valve assembly (50),
   a first pressure pickup (78), connected to the brake line (45) between the master brake cylinder (13) and the shutoff valve (70), and a second pressure pickup (79), connected to the brake line (45) between the shutoff valve (70) and the valve assembly (50), and
   an electronic control unit (82) for triggering the shutoff valve (70) and the drive motor (34) of the high-pressure pump (60) for generating a brake pressure level in the at least one wheel brake (48) that is dependent on signals of at least one of the pressure pickups (78, 79) and for triggering the valve assembly (50) as a function of wheel rotation behavior of the vehicle wheel associated with the at least one wheel brake (48),
   a charging valve (61) that can be switched out of its shutoff position (61a) into its open position (61b) by the control unit (82) is disposed in the intake line (58) of the high-pressure pump (60),
   the switch (15) upon brake actuation generates a signal which is directed to the electronic control unit for triggering the shut-off valve (70) which shifts to a blocking position (70b), the electronic control unit initiates operation of the motor (34) which drives the high-pressure pump (60), and moves the charging valve (61) in the intake line (58) into an open position (61b) provided a brake pressure buildup is demanded at the wheel brake (48) in non-anti-skid braking as well as for brake pressure modulation occurring in an anti-skid mode.

2. A hydraulic brake system as defined by claim 1, in which a low-pressure pump (86') is disposed in the intake line (58) between the pressure fluid supply container (14) and the charging valve (61), and that a feed line (90') having a one-way check valve (91') and leading to the brake line (45) between the shutoff valve (70) and the valve assembly (50) begins at the intake line (58) between the charging valve (61) and the high-pressure pump (60').

3. A hydraulic brake system as defined by claim 1, in which an overflow line (74) having a pressure limiting valve (75) and communicating at least indirectly with the pressure fluid supply container (14) begins at the brake line (45) between the pressure side of the high-pressure pump (60) and the shutoff valve (70) and is pilot-controllable by the brake pressure generated in the master brake cylinder (13) in order to increase the response pressure of the pressure limiting valve.

4. A hydraulic brake system (10) for motor vehicles, having an anti-lock and traction control system (11),
   a multicircuit master brake cylinder (13) with a pressure fluid supply container (14) and a brake-pedal-actuable switch (15),
   at least one brake line (45, 46) beginning at the master brake cylinder (13) and leading to at least one wheel brake (48) of a brake circuit (II),
   a valve assembly (50), assigned to the at least one wheel brake (48), for controlling phases for pressure buildup, pressure holding and pressure reduction for the brake pressure modulations in the wheel brake (48), wherein in the pressure reduction phase pressure fluid withdrawn from the wheel brake (48) is returned to the pressure fluid supply container (14),
   a shutoff valve (70) in the brake line (45) between the master brake cylinder (13) and the valve assembly (50),
   a high-pressure pump (60), drivable by an electric motor and capable of being supplied at least indirectly from the pressure fluid supply container (14)

through an intake line (58), which pump serves as a servo pressure source for feeding pressure fluid into the brake line (45) between the shutoff valve (70) and the valve assembly (50), a first pressure pickup (78), connected to the brake line (45) between the master brake cylinder (13) and the shutoff valve (70), and a second pressure pickup (79), connected to the brake line (45) between the shutoff valve (70) and the valve assembly (50), an electronic control unit (82) for triggering the shutoff valve (70) and the drive motor (34) of the high-pressure pump (60) for generating a brake pressure level in the at least one wheel brake (48) that is dependent on signals of at least one of the pressure pickups (78, 79) and for triggering the valve assembly (50) as a function of wheel rotation behavior of the vehicle wheel associated with the at least one wheel brake (48), a charging valve (61) that can be switched out of its shutoff position (61a) into its open position (61b) by the control unit (82) is disposed in the intake line (58) of the high-pressure pump (60), a low-pressure pump (86') is disposed in the intake line (58) between the pressure fluid supply container (14) and the charging valve (61), and that a feed line (90') having a one-way check valve (91') and leading to the brake line (45) between the shutoff valve (70) and the valve assembly (50) begins at the intake line (58) between the charging valve (61) and the high-pressure pump (60'), and a low-pressure reservoir (92') is connected to the intake line (58) between the low-pressure pump (86') and the charging valve (61), in which intake line a one-ay check valve (93') is located between the low-pressure pump (86') and the connection of the low-pressure reservoir (92').

* * * * *